United States Patent Office 3,201,459
Patented Aug. 17, 1965

3,201,459
(2-N-ALKYL'-N-ALKYL"AMINOETHYL)
GUANIDINE
Severina Coda, Vittorio A. Colo, and Alfredo Glaesser, Milan, and Claudio Pasini, Monza, Milan, Italy, assignors to Società Farmaceutici Italia, Milan, Italy, a corporation of Italy
No Drawing. Filed Nov. 19, 1962, Ser. No. 238,798
Claims priority, application Italy, Nov. 23, 1961, 21,034/61
9 Claims. (Cl. 260—501)

The invention relates to new compounds with hypotensive activity. More particularly our invention encompasses 2-amino- (di-substituted)-ethyl-guanidines having the formula:

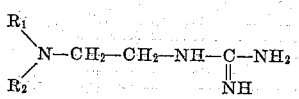

wherein $R_1$ and $R_2$ are different and each is selected from the group consisting of hydrogen, alkyl, cycloalkyl and aryl having from 1 to 7 carbon atoms, and addition salts of the above guanidines with organic or inorganic acids, and the process of their preparation.

In comparison with known guanidino-hypotensives, the new compounds of the invention represent a remarkable step forward in the therapy of hypertension. In comparison with guanetidine, [2-(octahydro-1-azocinyl)-ethyl]-guanidine sulphate, described by Maxwell et al. in Experientia, vol. 59 (1959), p. 267, some of the compounds of the invention show a greater hypotensive activity, a lower toxicity, a good intestinal spasmolytic action and do not have side effects, such as those associated with reserpines.

Our invention includes a process of preparing the new compounds of the invention, which comprises condensing the corresponding $N^1,N^1$-di-substituted ethylene-diamine dissolved in water or in an organic solvent, with cyanamide, its salts, or a compound having the following structural formula:

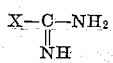

wherein X is a substituent capable of condensing with an amino group or its salts. The resulting 2-amino (mono- or di-substituted) ethyl-guanidine may then be separated as such or as an addition salt with an organic or inorganic acid.

The $N^1,N^1$-di-substituted ethylenediamines which are the starting materials for the process of the invention, are preferably obtained by saponifying, with hydrazine, the corresponding phthalimido-ethyl-derivatives, obtained by reaction of 2-bromoethyl-phthalimide with a di-substituted amine.

The condensation of the invention takes place in water or an organic solvent, is preferably carried out in water; alcohols, such as methyl-, ethyl-, propyl-, or t-butyl-alcohol; ethers, such as dioxane; ketones, such as acetone and methyl-ethyl-ketone; and lower aliphatic acids such as acetic acid; it may be carried out at room temperature, but it is preferably performed in the warm over a period ranging from 3 to 10 hours.

The compounds having the formula:

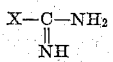

wherein X is a substituent able to react with an anion group and which may be used instead of cyanamide may be an S-alkyl-isothiourea, such as S-methyl-isothiourea or an O-alkyl-isourea, such as O-methyl-isourea or even 1-guanyl-3,5-dimethylpyrazole or salts of such compounds with an inorganic acid.

The 2-amino-(di-substituted)-ethyl guanidine thus obtained, may be isolated either as a non-toxic addition salt of an inorganic acid, such as the hydrochloride, hydrobromide, nitrate, sulphate, or phosphate or of an organic acid such as the acetate, propionate, oxalate, malonate, benzoate, phenyl-acetate, aminobenzoate, hydroxybenzoate, salicylate, benzenesulphonate, toluenesulphonate, naphthalenesulphonate or analogues, by adding the appropriate acid to the reaction mixture or they may be separated as free bases by treatment of one of the above mentioned salts with an alkaline reagent, such as sodium or potassium hydroxide, carbonate or bicarbonate. By suitably regulating the addition of the acid, a neutral or basic salt may be obtained and separated.

The products of the invention show an inhibiting, peripheric action selective to the sympathetic nervous system, while they do not modify the cholinergic activity and do not paralyze the parasympathetic system. Their hypotensive action, has a protracted duration, and the decrease in blood pressure appears slowly. Owing to high hypotensive activity, low toxicity and absence of side effects, the products of the invention may be employed in the therapy of hypertension of any origin.

The posology in human therapy is of 5–100 mg./day of active product, so such a quantity may be included in a dosage unit. The pharmaceutical compositions employed consist of one of the products of the invention, preferably as a salt and a therapeutically acceptable carrier either solid or liquid. The compositions may be prepared as tablets, powders, pills, solutions, suspensions and in other pharmaceutical forms suitable for oral or intravenous administration. Excipients, when present, may be starch, lactose, talc, stearic acid, magnesium stearate, pectin or others usually used for this purpose.

The following examples illustrate, but not to limit, the present invention.

EXAMPLE 1.— N-(2-GUANIDINOETHYL)-ETHYL-ISOPROPLYAMINE SULPHATE (I)

11 g. of ethyl-isopropylamine are warmed to 130° C. for 15 hours with 7 g. of 2-bromo-ethyl-phthalimide in a sealed tube. The excess amine is eliminated by evaporation. The residue is treated with cooling with a concentrated solution of potassium hydroxide and ether and is repeatedly extracted with ether. The ether solution, dried over potassium carbonate, is evaporated to dryness. The oily residue, thus obtained, consisting of N-(2-phthalimido-ethyl)-ethyl-isopropylamine, is refluxed, at first, for 2 hours with 1.5 cc. of hydrazine hydrate and 35 cc. of alcohol, then for a further 4 hours with 6 cc. of concentrated hydrochloric acid. After diluting with an equal volume of water, phthalhydrazide is precipitated and eliminated by filtration. The filtrate is evaporated to dryness, reacted with a solution of concentrated potassium hydroxide, repeatedly extracted with ether and fractionated in vacuo. N-(2-aminoethyl)-ethyl-isopropylamine, boiling at 72–73° C. at 30 mm. Hg, is obtained. 2.6 g. of N-(2-aminoethyl)-ethyl-isopropylamine and 2.8 of S-methylisothiourea sulphate are refluxed for 7 hours in 8 cc. of water. After cooling and acidifying with 2 N sulphuric acid (to pH 5), the reaction mixture is evaporated to dryness in vacuo and the residue is reacted with alcohol. The crude sulphate of N-(2-guanidino-ethyl)-ethyl-isopropylamine crystallizes from a small amount of water by diluting with alcohol. It crystallizes with one molecule of water of crystallization and melts at 274–275° C. with decomposition.

EXAMPLE 2.—N-(2-GUANIDINOETHYL)-ETHYL-ISOBUTYLAMINE SULPHATE (IV)

N-(2-aminoethyl)-ethyl-isobutylamine (boiling at 45–47° C. at 12 mm. Hg) is prepared by reacting ethyl-isobutylamine with 2-bromoethyl-phthalimide and then saponifying the N-(2-phthalimido-ethyl)-ethyl-isobutylamine thus obtained with hydrazine hydrate. 5 g. of this N-(2-aminoethyl)-ethyl-isobutylamine and 5 g. of S-methyl-isothiourea sulphate, 10 cc. of water and 1 cc. of ethyl alcohol are refluxed for 7 hours as in Example 1. When the development of methyl-mercaptan is over, the reaction mixture is cooled, and a crystalline substance separates. By treatment with 2 N sulphuric acid until the pH is 5, the precipitate is dissolved. The mixture is evaporated nearly to dryness in vacuo and the residue is taken up with alcohol. The crystalline substance, consisting of N-(2-guanidinoethyl)-ethyl-isobutylamine sulphate, is filtered off and washed with alcohol; it melts at 213–215° C. Yield 9.8 g.

EXAMPLE 3.—N-(2-GUANIDINOETHYL)-METHYL-BENZYLAMINE SULPHATE (V)

N-(2-aminoethyl)-methyl-benzylamine (boiling at 124–130° C. at 12 mm. of Hg) is prepared by reacting methyl-benzylamine with 2-bromoethyl-phthalimide and then saponifying the N-(2-phthalimido-ethyl)-methyl-benzylamine thus obtained, with hydrazine hydrate. 1.3 g. of this N-(2-aminoethyl)-methyl-benzylamine and 1.1 g. of S-methyl-isothiourea sulphate are refluxed in 4 cc. of water over a period of 7 hours as in Example 1. When the reaction is over, the reaction mixture is cooled, acidified to pH 5 with 2 N sulphuric acid and evaporated to dryness in vacuo. By treating the residue with alcohol, N-(2-guanidino-ethyl)-methyl-benzylamine sulphate is obtained, which after recrystallization from water-alcohol, melts at 235–237° C. Yield 1.75 g.

EXAMPLE 4.—N-(2-GUANIDINOETHYL)-ISOPROPYL-ISOBUTYLAMINE SULPHATE (VI)

N-(2-aminoethyl)-isopropyl-isobutylamine (boiling at 77° C. at 10 mm. Hg) is prepared by reaction of isopropyl-isobutylamine with 2-bromoethyl-phthalimide and then saponifying the N-(2-phthalimido-ethyl)-isopropyl-isobutylamine thus obtained, with hydrazine hydrate. 2.2 g. of this N-(2-aminoethyl)-ethyl-isopropylamine and 2 g. of S-methyl-isothiourea sulphate are refluxed in 3 cc. of water and 3 cc. of ethyl alcohol over a period of 7 hours as in Example 1. The reaction mixture is cooled, its pH is adjusted to 5 with 2 N sulphuric acid and it is concentrated in vacuo. The residue is taken up with ethyl alcohol at 96° C. and it turns into a crystalline product consisting of N-(2-guanidinoethyl)-isopropyl-isobutylamine sulphate which is filtered and washed with alcohol. The resulting product melts at 148–150° C. and contains one molecule of water of crystallization. Yield 3.2 g.

EXAMPLE 5.—N-(2-GUANIDINOETHYL)-METHYL-ISOBUTYLAMINE SULPHATE (IX)

N-(2-aminoethyl)-methyl-isobutylamine (boiling at 150–160° C. at 760 mm. Hg) is prepared by reacting methyl-isobutylamine with 2-bromoethyl-phthalamide and then saponifying with hydrazine hydrate the N-(2-phthalimido-ethyl)-methyl-isobutylamine thus obtained. 2.8 g. of this N-(2-aminoethyl)-methyl-isobutyl-amine and 3 g. of S-methyl-isothiourea sulphate, 5 cc. of water and 10 cc. of alcohol are refluxed for 8 hours as in Example 1. The reaction mixture is cooled, the pH is adjusted to 5 with 2 N sulphuric acid, evaporated to dryness and washed with alcohol. A crystalline precipitate consisting of N-(2-guanidinoethyl)-methyl-isobutylamine sulphate results and is filtered and washed with alcohol. It melts at 258–259° C. Yield 3.7 g.

Pharmacology (a) *Relaxation of the nictitating membrane.*—The activity of the products of our invention, which paralyze the sympathetic system, was tested by examining the relaxation of the nictitating membrane of an awake cat. The products were administered intravenously at the dose of 10 mg. per kg. body weight in aqueous solution. The results obtained for some of the products of the invention are reported in Table 1 and compared with those obtained with [2-(octahydro-1-azocinyl)-ethyl]-guanidine sulphate.

TABLE 1

| Guanidino-Hypotensive | Relaxation of nictitating membrane | |
|---|---|---|
| | Intensity | Duration (hours) |
| 2-(octahydro-1-azocinyl)-ethyl-guanidine sulphate | +++ | 65 (56–96) |
| I | +++ | 35 (29–48) |
| IV | +++ | 35 (25–96) |
| VI | +++ | 7 (1–24) |
| IX | ++++ | 85 (65–120) |

The Roman numerals in Table 1 refer to the products of the examples above presented.

The intensity of the relaxation was evaluated on the basis of the percentage of eyeball surface (visible when the eye is normally open) covered by the nictitating membrane and has been indicated in Table 1 as follows:

$$(++++) > 60\%; \ (+++) = 60\%; \ (++) = 30\%$$
$$(+) = 10\%$$

By "duration" we mean the time elapsing between the beginning of relaxation and return to normality. The values in brackets are the minimum and maximum duration observed.

(b) *Acute toxicity.*—The lethal dose ($LD_{50}$) of some products of the present invention has been determined in the mouse and compared with that of (2-octahydro-1-azocinyl)-ethyl-guanidine sulphate.

TABLE 2

| Guanidino-Hypotensive | $LD_{50}$—mouse (endoperitoneously), mg./kg. |
|---|---|
| 2-(octahydro-1-azocinyl)-ethyl-guanidine-sulphate | 170 |
| I | 400 |
| IV | 100 |
| VI | 75 |
| IX | 200 |

By the term "lethal dose" ($LD_{50}$) we mean the dose of active product, expressed in mg. per kg. body weight which, when administered endoperitoneously, it is able to kill 50% of treated animals in 48 hours.

We claim:
1. A compound selected from the group consisting of 2-amino-(di-substituted)-ethyl-guanidines having the formula:

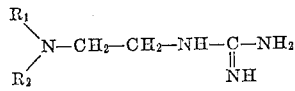

wherein $R_1$ and $R_2$ are different alkyl groups having from 1 to 7 carbon atoms, and the non-toxic acid addition salts thereof.
2. N-(2-guanidinoethyl)-ethyl-isopropylamine.
3. Non-toxic acid addition salt of N-(2-guanidinoethyl)-ethyl-isopropylamine.
4. N-(2-guanidinoethyl)-ethyl-isobutylamine.
5. Non-toxic acid addition salt of N-(2-guanidinoethyl)-ethyl-isobutylamine.
6. N-(2-guanidinoethyl)-isopropyl-isobutylamine.

7. Non-toxic acid addition salt of N-(2-guanidino-ethyl)-isopropyl-isobutylamine.
8. N-(2-guanidinoethyl)-methyl-isobutylamine.
9. Non-toxic acid addition salt of N-(2-guanidino-ethyl)-methyl-isobutylamine.

References Cited by the Examiner

UNITED STATES PATENTS 1,672,029  6/28  Heyn _____ 260—564

FOREIGN PATENTS 1,107,215  5/61  Germany.

OTHER REFERENCES

Greenhalgh et al.: Brit. J. Pharmacol., vol. 11, pp 220-224 (1956).

Hull et al.: J. Chem. Soc. (London), volume of 1947, pages 41–52.

Lespagnol et al.: Bull. soc. chim France, vol. of 1960, pp. 383–389.

Mull et al.: J. Org. Chem., vol. 25, pp. 1953–1956 (1960).

Rubinshtein et al.: C. A. vol. 39, p. 2291 (1945).

CHARLES B. PARKER, *Primary Examiner.*